United States Patent
Isaac et al.

(10) Patent No.: US 9,998,567 B2
(45) Date of Patent: Jun. 12, 2018

(54) CONTACTLESS COMMUNICATION INTERFACE SYSTEMS AND METHODS

(71) Applicant: Keyssa Systems, Inc., Campbell, CA (US)

(72) Inventors: Roger D. Isaac, San Jose, CA (US); Srikanth Gondi, Cupertino, CA (US)

(73) Assignee: KEYSSA SYSTEMS, INC., Campbell, CA (US)

(*) Notice: Subject to any disclaimer, the term of this patent is extended or adjusted under 35 U.S.C. 154(b) by 97 days.

(21) Appl. No.: 14/841,386

(22) Filed: Aug. 31, 2015

(65) Prior Publication Data

US 2017/0064043 A1   Mar. 2, 2017

(51) Int. Cl.
| | |
|---|---|
| H04L 12/26 | (2006.01) |
| H04L 29/06 | (2006.01) |
| H04L 12/725 | (2013.01) |
| H04B 5/00 | (2006.01) |
| H04B 5/02 | (2006.01) |

(52) U.S. Cl.
CPC ........... *H04L 69/08* (2013.01); *H04B 5/0031* (2013.01); *H04B 5/02* (2013.01); *H04L 43/0882* (2013.01); *H04L 45/302* (2013.01); *H04L 69/18* (2013.01)

(58) Field of Classification Search
CPC ... H04L 69/08; H04L 43/0882; H04L 45/302; H04L 69/18; H04B 5/0031; H04B 5/02
USPC ......................................................... 370/236
See application file for complete search history.

(56) References Cited

U.S. PATENT DOCUMENTS

| | | | |
|---|---|---|---|
| 2006/0043164 A1* | 3/2006 | Dowling | G06Q 20/04 235/375 |
| 2007/0263596 A1* | 11/2007 | Charrat | H04L 45/54 370/351 |
| 2009/0166421 A1* | 7/2009 | Finn | G06K 7/0008 235/439 |
| 2010/0322076 A1 | 12/2010 | Goel | |
| 2013/0044028 A1 | 2/2013 | Lea et al. | |
| 2014/0273833 A1* | 9/2014 | McCormack | H04B 5/0031 455/41.1 |

FOREIGN PATENT DOCUMENTS

WO   2005/024567   3/2005

\* cited by examiner

*Primary Examiner* — Sai Ming Chan
(74) *Attorney, Agent, or Firm* — Van Court & Aldridge LLP (57) ABSTRACT

Embodiments discussed herein refer to systems, methods, and circuits for managing and establishing contactless communications lanes between two contactlessly coupled systems. A contactless communication lane can be formed for each coupled pair of contactless communication units existing in the two systems. A contactless communications interface can enable software-defined connectivity that manages use of the contactless communication data lanes to enable data communications according to a selected one of a plurality of communications interfaces. The contactless communications interface may serve as a protocol translator and virtualization layer for enabling higher level software such as an operating system of a first system to communicate with a second system without requiring interface protocol specific hardware and software. This advantageously simplifies hardware and software components needed to simultaneously service a multitude of interface protocols.

20 Claims, 8 Drawing Sheets

CONTACTLESS COMMUNICATION INTERFACE SYSTEMS AND METHODS

FIELD OF THE INVENTION

The present disclosure relates to extremely high frequency ("EHF") systems and methods for the use thereof, and more particularly to a contactless communications interface for use in a contactless communications system.

BACKGROUND

Electronic devices can be "connected" together to enable data transfer between the devices. Typically, the connection between the two devices can be a cabled connection or a wireless connection. A cabled connection such as USB ("Universal Serial Bus") is typically point-to-point, and requires mechanical connectors at each device, and a cable between the devices. A wireless connection such as WiFi or Bluetooth can operate in a "broadcast" mode, where one device can communicate simultaneously with several other devices, over a radio frequency ("RF") link, typically in the range of 700 MHz-5.8 GHz.

Data may be transferred between devices based on a protocol that governs electrical and software requirements necessary to ensure compatibility among different devices. Each protocol is different and thus the electrical and software requirements are different. As a result, any device that communicates according to a particular protocol is equipped with the hardware and software components designed to enable communications according to that protocol. If the same device wishes to communicate according to another protocol, additional hardware and software components for that protocol are needed. Thus, as more protocols are supported, additional hardware and software components are needed, thereby raising costs and real estate requirements.

BRIEF SUMMARY

Embodiments discussed herein refer to systems, methods, and circuits for establishing EHF contactless communications links using a contactless communications interface. The EHF contactless communication link may serve as an alternative to conventional board-to-board and device-to-device connectors. The link may be a low-latency protocol-transparent communication link capable of supporting a range of data rates. The link may be established through a close proximity coupling between devices, each including at least one EHF communication unit. The link can support multiple lanes when each device includes multiple instances of EHF communication units. Data communicated across the link may be governed by an interface protocol that is agreed upon by the coupled devices.

The contactless communications interface may enable software defined connectivity that manages use of contactless communication data lanes to enable data communications according to a selected one of a plurality of interface protocols. The contactless communications interface may serve as a protocol translator and virtualization layer for enabling higher level software such as an operating system of a first device to communicate with a second device without requiring interface protocol specific hardware and software. Thus, regardless of which interface protocol is selected to govern communications between devices, the contactless communications interface may map the selected protocol used by the higher level software to a virtual protocol that communicates with the at least one EHF communications unit. The virtual protocol may be part of the virtualization layer that can interface with the EHF communication units. This enables the contactless communications interface to be interface protocol agnostic. The agnostic nature may be realized because the EHF communication units are not constrained by the same electrical and software requirements of conventional wired and wireless connections that use the same interface protocols. As a result, the virtualization layer can support multiple interface protocols without requiring redundant hardware and software components.

In addition, because the lanes between the higher level software and the EHF communication units are virtualized, the contactless communication interface may manage the use of those lanes. For example, the interface may selectively activate and deactivate lanes based on which interface protocol is selected. In some approaches, the interface may embody a quality of service algorithm that accounts for various criteria in controlling use of the lanes. For example, the quality of service algorithm may change directions of one or more lanes to better accommodate bandwidth requirements.

In one embodiment, a system is provided that includes a first set of contactless communication transceiver units (CCTUs) operable to contactlessly communicate data with a second set of CCTUs associated with a second system, wherein a data lane is formed for each coupled pair of CCTUs established between the first and second sets. The system can include an operating system operative to communicate with the second system using at least one non-contactless interface protocol, wherein each of the at least one non-contactless interface protocol is characterized by a transport layer, a link layer, and a physical layer. The system can also include a contactless communications interface (CCI) coupled to the first set of CCTUs and the operating system, the CCI enables the operating system to use any interface protocol to communicate with the second system via the first set of CCTUs by translating any non-contactless interface protocol being used by the operating system to a contactless protocol.

In another embodiment, a method for managing contactless communication lanes that exist between coupled pairs of CCTUs included in first and second systems is provided. The method can include determining first system characteristics, determining second system characteristics, identifying all potential interface protocols that can be used to govern communication of data over the contactless communication lanes existing between the first and second systems based on the determined first and second system characteristics, and resolving to use at least one of the identified potential interface protocols.

In yet another embodiment, a system can include a first set of CCTUs operable to contactlessly communicate data with a second set of CCTUs associated with a second system, wherein a contactless communication data lane is formed for each coupled pair of CCTUs established between the first and second sets. The system can include a CCI coupled to the first set of CCTUs, the CCI enables software defined connectivity that manages use of the contactless communication data lanes to enable data communications according to a selected one of a contactless protocol and plurality of non-contactless interface protocols.

A method being implemented in a first system is provided. The first system can include a first set of CCTUs operable to contactlessly transmit data with a second set of CCTUs associated with a second system, wherein a data lane is formed for each coupled pair of CCTUs established between the first and second sets. The method can include receiving a message, from the second system, defining communications capabilities of the second system, configuring the first system to communicate according to the communications capabilities of the second system, monitoring usage of the data lanes, and dynamically adjusting usage of the data lanes in response to at least one of an application that requires access to the data lanes and quality of service.

Another method for managing contactless communication lanes is provided. The method can be implemented in a first system, and can include establishing a contactless communication connection with a second system, the contactless communication connection characterized by ability to transport data across at least one contactless communication lane. The method can include monitoring system usage criteria pertaining to data being communicated across the at least one contactless communication lane, managing control of the at least one contactless communication data lane based on the monitored system usage criteria, the managing comprising designating each contactless communication lane as one of a downstream lane, an upstream lane, a bi-directional lane, and a null lane.

A CCI for use in a system having at least one contactless EHF transceiver is provided. The CCI can include a translation layer module coupled to receive data associated with at least one non-contactless transport layer, the translation layer module translates the at least one non-contactless interface transport layer to a contactless layer, and at least one communications interface lane (CIL) coupled to receive data associated with the contactless layer from the translation layer module, wherein each CIL is coupled to one of the at least one contactless EHF transceiver.

A further understanding of the nature and advantages of the embodiments discussed herein may be realized by reference to the remaining portions of the specification and the drawings.

DETAILED DESCRIPTION

Illustrative embodiments are now described more fully hereinafter with reference to the accompanying drawings, in which representative examples are shown. Indeed, the disclosed communication system and method may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices is important to their operation. In order to provide improved secure high-bandwidth communications, the unique capabilities of wireless communication between electronic devices and between sub-circuits within each device may be utilized in innovative and useful arrangements.

Such communication may occur between radio frequency communication units, and communication at very close distances may be achieved using EHF frequencies (typically, 30-300 GHz) in an EHF communication unit. An example of an EHF communications unit is an EHF comm-link chip. Throughout this disclosure, the terms comm-link chip, and comm-link chip package are used to refer to EHF antennas embedded in IC packages. Comm-link chips are an example of a communication component, also referred to as contactless communication unit, a CCU or EHF transceiver (EHF XCVR).

The term "transceiver" may refer to a component such as an IC (integrated circuit) including a transmitter (Tx) and a receiver (Rx) so that the integrated circuit may be used to both transmit and receive information, such as data. Such a transceiver may be referred to herein as a contactless communications unit (CCU) or an EHF XCVR. Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to the implementing electromagnetic rather than electrical (wired, contact-based) connections and transport of signals between entities, such as electronic devices. As used herein, the term "contactless" may refer to a carrier-assisted, dielectric coupling system. The connection may be validated by proximity of CCUs contained in different. Multiple contactless transmitters and receivers may occupy a small space. A contactless link established with electromagnetics may be point-to-point in contrast with a wireless link which typically broadcasts to several points.

The RF energy output by the EHF transceivers described herein may be designed to adhere to various requirements mandated by one or more governments or their agencies. For example, the FCC may promulgate requirements for certification for transmitting data in a RF frequency band.

"Standards" and related terms such as "Standards-based", "Standards-based interfaces", "Standards-based protocol", "interface protocols," and the like may refer to legacy interface standards which may include but are not limited to USB (e.g., USB 2, USB 3, USB 3/2, or USB OTG), DisplayPort (DP), Thunderbolt, HDMI, SATA/SAS, PCIe, Ethernet SGMII, Hypertransport, Quickpath, I2S, GPIO, I2C and their extensions or revisions. For example, the term "interface protocol" may refer to the protocol being used by one system to communicate with another system. As a specific example, the interface protocol being used by a system may be a USB interface protocol; as such, the system may communicate according to the rules governing USB communications.

Each interface protocol may require its own stack, including, for example a protocol layer (PROTO layer), link layer (LINK layer), and physical layer (PHY layer). In wired interface protocols, the PHY layer can include a connector. The connector may represent the physical size, shape, and pin out of a port that interacts with a partner port or connector. The PHY layer specifies the electrical characteristics of the interface. More specifically, the PHY layer provides an electrical interface to the transmission medium, defines physical and electrical characteristics such as connections, voltage levels and timing, and defines the means of transmitting raw bits rather than logical data packets over a physical link. The bit stream may be grouped into code words or symbols and converted to a physical signal that is transmitted over a transmission medium. The LINK layer may be responsible for establishing and maintaining a reliable channel between a host and a device. More specifically, the LINK layer may encode bits into packets prior to transmission and then decode the packets back into bits at the destination, may provide reliable data transfer by transmitting packets with the necessary synchronization, error control and flow control, and may provide for logical link control, media access control, hardware addressing, error detection and interfacing with the PHY. The LINK layer may be divided into sublayers including but not limited to the media access control (MAC) sublayer and the logical link control (LLC) sublayer. The PROTO layer may mange the flow of data between devices, and specify how different packet structures are used.

Thus, based on the foregoing, a USB interface may, for example, have its own USB PROTO layer, a USB specific LINK layer, USB specific PHY layer, and USB specific connector. As another example, a DisplayPort interface may have its own DisplayPort PROTO layer, a DisplayPort specific LINK layer, DisplayPort specific PHY layer, and DisplayPort specific connector.

Figure 1:
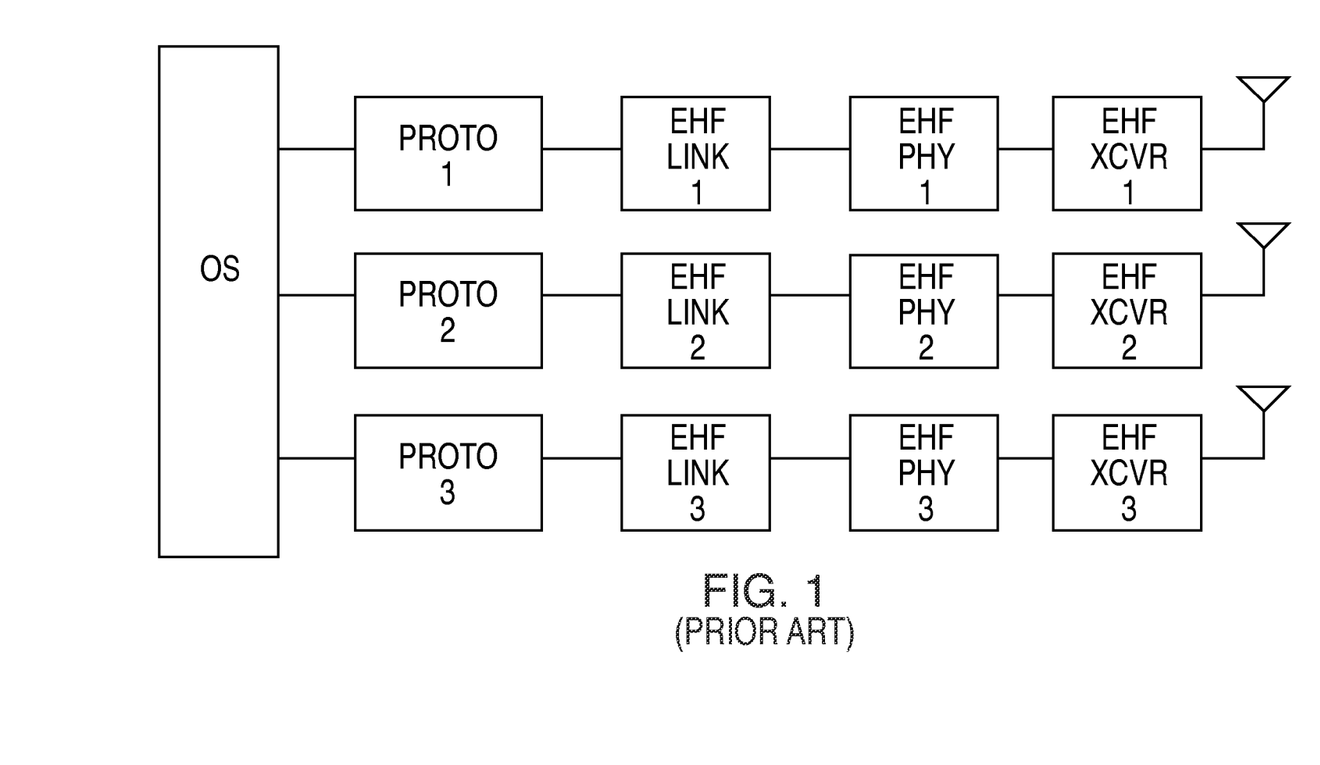
FIG. 1 shows conventional wired connector interface protocols being used in conjunction with contactless connector transceiver units.

FIG. 1 shows conventional protocols, and their respective layers, being used in conjunction with contactless connector transceiver units. As shown, the physical connector is replaced with a contactless connector transceiver unit, but each interface requires its own specific layers. For example, interface 1 includes PROTO 1 layer, EHF LINK 1 layer, EHF PHY 1 layer, and EHF XCVR. PROTO 1 layer may represent the interface protocol being used by the operating system to communicate with another system. EHF LINK 1 layer may be a LINK layer specifically designed to communicate with the PROTO 1 layer and the EHF PHY 1 layer, and PHY 1 layer may be specifically designed to communicate with EHF XCVR. FIG. 1 also shows separate PROTO, LINK, and PHY layers for interfaces 2 and 3.

A disadvantage of the approaches of FIG. 1 is that each interface requires its own custom layers in order to enable communications for that interface. This can be costly to implement and may require too much integrated circuit and/or board real estate. Embodiments discussed herein eliminate the need for redundant interface specific layers by employing a contactless interface that enables the EHF LINK layer and EHF PHY layer to be used as contactless layers that can interface with the EHF XCVR. Using contactless layers eliminates the need to have dedicated layers for each interface protocol. That is, regardless of the interface being accessed, only one set of contactless layers is needed (e.g., lone contactless LINK and contactless PHY layers may be used in conjunction with any interface). This is illustrated in FIG. 2.

Figure 2:
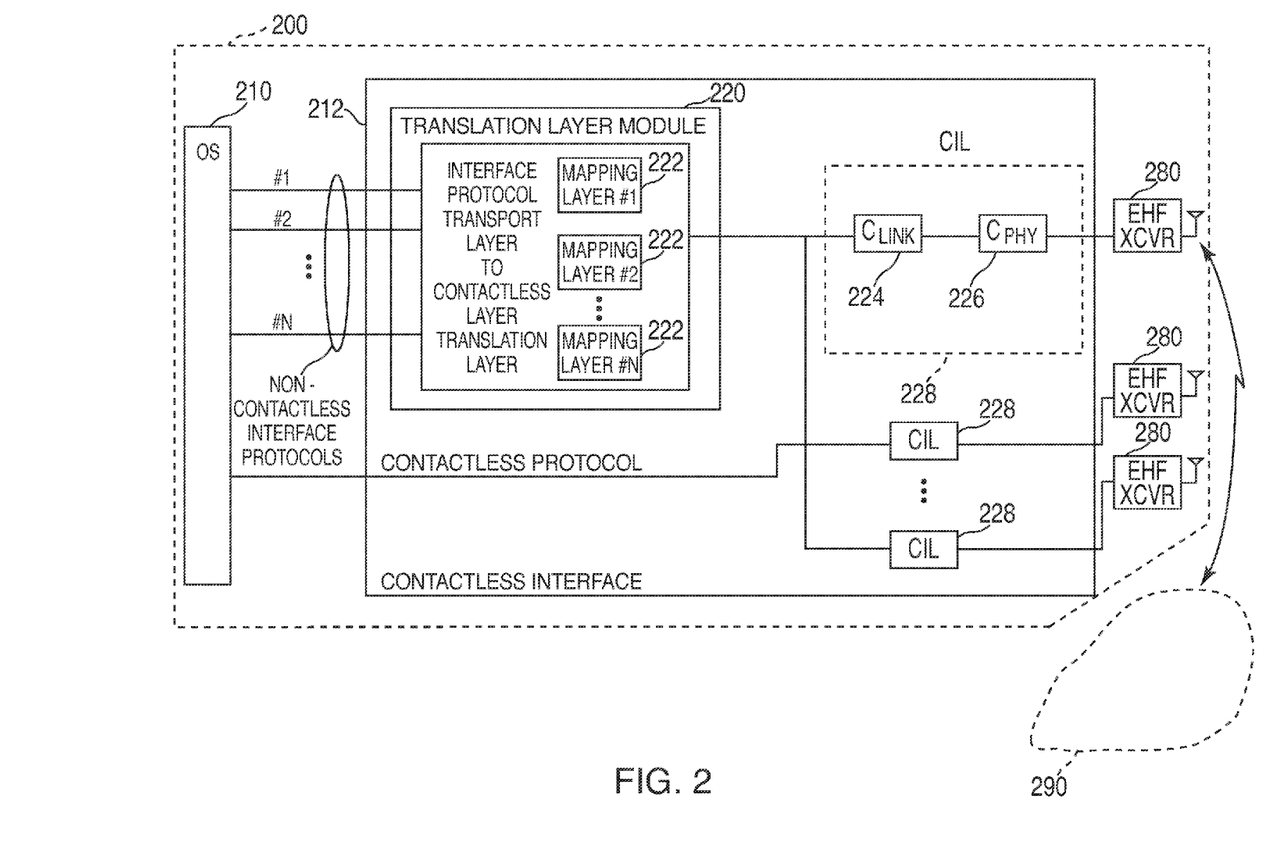
FIG. 2 shows a diagram illustrating use of virtual layers in enabling communications according to any interface/protocol, according to an embodiment.

FIG. 2 shows a diagram illustrating use of a contactless interface in enabling communications according to any interface protocol without requiring protocol specific LINK and PHY layers for each interface protocol. In particular, FIG. 2 shows system 200 that can include operating system (OS) 210, contactless interface 212, and EHF XCVRs 280. Contactless interface 212 can include translation layer module 220 and contactless interface lanes (CIL) 228, which can include a contactless LINK layer and a contactless PHY layer. Translation module 220 may function as a translation layer that enables OS 210 to use any interface protocol it desires when communicating with system 290. For example, if OS 210 communicates according to a first interface protocol, it may use a transport layer commensurate with that interface. Translation module 220 may translate that transport layer to a contactless protocol that can interface with contactless LINK and PHY layers (or one of the CILs 228). More particularly, module 220 may map the incoming protocol to the contactless protocol using one of mapping layer modules 222. A mapping layer module 222 exists for each transport layer that needs to be translated into the contactless layer. For example, OS 210 may communicate with module 220 according to a first non-contactless protocol, and mapping layer #1 may map the transport layer of the first non-contactless protocol to the contactless layer. Mapping layer #2 may translate the transport layer of a second non-contactless protocol to the contactless layer. Any number of additional mapping layers can be included to accommodate any additional number of non-contactless transport layers. After any non-contactless interface protocol is mapped to the contactless layer, data associated with the incoming protocol may interface with contactless LINK layer ("$C_{LINK}$ layer") 224, which interfaces with contactless PHY layer ("$Cp_{PHY}$ layer") 226. $C_{PHY}$ layer 226 may interface with EHF XCVR 280. $C_{LINK}$ 224 is a contactless link layer that is compatible with EHF XCVR 280 and that performs link layer functionality. $C_{PHY}$ 226 is a contactless physical layer that is compatible with EHF XCVR 280 and that performs physical layer functionality.

$C_{LINK}$ 224 and $C_{PHY}$ 226 may be collectively referred to as CIL 228. Multiple instances of CIL 228 may be provided to service multiple instances of EHF XCVR 280. In other words, each EHF XCVR 280 may be associated with its own CIL 228. Thus, as shown in FIG. 2, three CILs 228 are shown to exist between module 220 and EHF XCVR 280. It should be appreciated that if fewer or additional EHF XCVRs are present, a commensurate number of CILs may also be present. In another embodiment, the number of EHF XCVRs may exceed the number of CILs. Thus, this may potentially create usage scenarios where the number of active EHF XCVRs exceeds the number of CILs. In these scenarios, the CILs may be multiplexed in order to service the active EHF XCVRs.

Use of translation layer module 220 enables OS 210 to use the transport layer it expects to interface with when communicating data to system 290, and vice versa. The translation of the interface protocol is transparent to OS 210 and requires no change in the manner OS 210 would otherwise normally operate. For example, as discussed above, when OS 210 is operating according to a first non-contactless interface protocol, it uses the transport layer of that protocol stack when interfacing with module 220. The data entering module 220 is translated to the contactless layer and passed to EHF XCVR 280 via CIL 228.

System 200 may communicate with system 290 according to any interface protocol. In one embodiment, the interface protocol used to communicate between systems 200 and 290 may be based on an exchange between the two systems where the systems decide which one or more available protocols should be used. The interface protocol can be a contactless interface protocol or a non-contactless interface protocol. A contactless interface protocol, as defined herein, refers to a protocol that is native to CILs and thus enables OS 210 to directly access the CILs without having to pass through translation layer 220 in order to communicate data via EHF XCVR(s). Data being communicated according to the contactless protocol is shown flowing from OS 210 directly to one of the CILs. Non-contactless interface protocols, as defined herein, refer to a protocol that is not native to CILs and require translation to the contactless layer in the translation layer module 220 in order to communicate via EHF XCVR(s). Data being communicated according to several different non-contactless interface protocols (shown as numbers 1 through N) are shown flowing from OS 210 to translation module 220.

It should be appreciated that data may be received from system 290 via the EHF XCVR(s) 280. Data being received at EHF XCVR(s) 280 may be translated from the contactless layer to a designated transport layer if OS 210 is expecting the data to be received according to that particular transport layer. If OS 210 is expecting the data to be received according to the contactless layer, then that data can be passed directly from the CIL(s) 228 to OS 210. Furthermore, data may be simultaneously exchanged between systems 200 and 290 via EHF XCVR(s) 280. Depending on which protocols OS 210 is using, module 220 may or may not be needed. It should be appreciated that even though OS 210 is being shown as a component that communicates with translation module 220, other layers (e.g., an application layer) may take the place of or be used in addition to OS 210.

Figure 3:
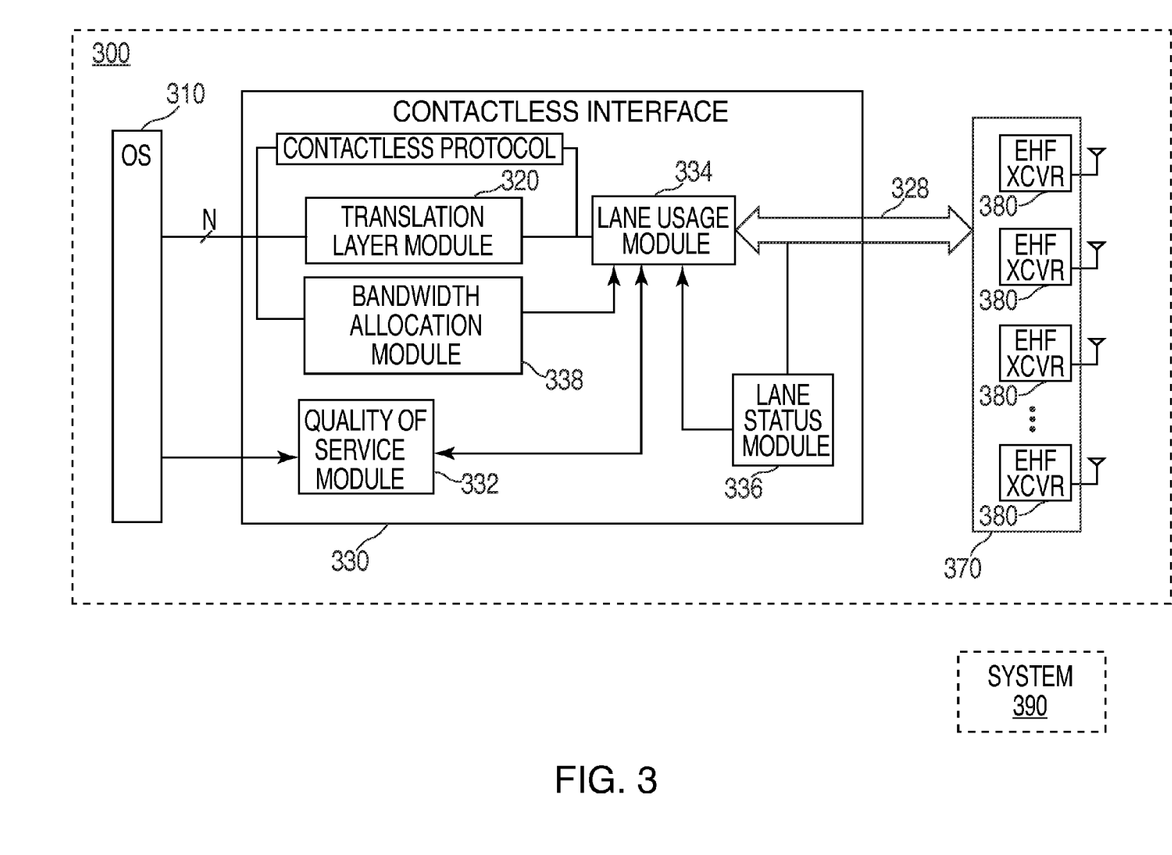
FIG. 3 shows a diagram illustrating a system using a contactless communications interface, according to an embodiment.

FIG. 3 shows a diagram illustrating a system using a contactless communications interface in accordance with an embodiment. FIG. 3 is similar in FIG. 2, but includes additional details on the contactless interface. As shown, system 300 can include OS 310, contactless communications interface 330, and contactless communication lanes 370. OS 310 may be similar to OS 210 of FIG. 2. Contactless interface 330 may function as an interface for enabling OS 310 to communicate with system 390 via contactless communication lanes 370. Contactless interface 330 may include translation layer module 320 (which may be similar to module 220 of FIG. 2), CILs 328, quality of service module 332, lane usage module 334, lane status module 336, and bandwidth allocation module 338. Contactless communication lanes 370 may include several EHF XCVRs 380, each of which may form a contactless communications lane with a counterpart EHF XCVR (not shown) in system 390. Each lane may be bi-directional or unidirectional depending on the configuration and capabilities of the counterpart EHF XCVRs that form the lane. For example, if one XCVR is configured for transmission only and its counterpart XCVR is configured as a receiver only or both a transmitter and receiver, the communications lane is effectively unidirectional. If, for example, both counterpart XCVRs are capable of transmitter and receiver functionality, then the communications lane may be bi-directional. As will be described in more detail below, knowledge of the communications lane may be used by contactless interface 330 to make decisions on lane usage.

Contactless interface 330 can enable system 300 to select among any number of interfaces for intersystem communications and to switch from one interface protocol to another. For example, during a connection event between systems 300 and 390, one or both systems may resolve to communicate according to a first interface protocol, which may be the contactless protocol or any number of different non-contactless protocols. When a non-contactless protocol is used, any data flowing between systems 300 and 390 may pass through translation layer module 320, lane usage module 334, and CILs 328. Contactless interface 330 can enable such communication without requiring LINK and PHY layers specifically designed for the first non-contactless interface protocol. When the contactless protocol is used, data may bypass module 320 and pass directly to lane usage module 334. If desired, at a later time, both systems 300 and 390 may resolve to communicate according to a second interface protocol. If the second interface protocol is non-contactless, contactless interface 330 can enable such communication without requiring dedicated LINK and PHY layers specifically designed for the second interface protocol.

Contactless interface 330 can enable system 300 to make dynamic changes with respect to communications lane usage. Such dynamic lane usage can be exercised using lane usage module 334, lane status module 336, bandwidth allocation module 338, and quality of service module 332. For example, lane usage may be dynamically controlled to accommodate user preferences, system demands, quality of service assurances, total and available system bandwidth, downstream bandwidth requirements, upstream bandwidth requirements, lane status, lane turn-around time, interface settings, and any other suitable criteria. These criteria may be provided as inputs (e.g., from OS 310, modules 332, 336, and 338) that are fed into a lane usage algorithm (e.g., being implemented by lane usage module 334) that may ultimately control usage of contactless communications lanes 370.

Lane usage module 334 may operate as a scheduler that controls the flow of data across lanes 370 based on the lane usage algorithm. For example, lane usage module 334 may decide how many lanes to activate, and within those activated lanes, module 334 may decide which are used to send data downstream, which are used to send data upstream, which are used to alternate between downstream and upstream transmission. The decisions made by module 334 may dynamically change based on the criteria being fed to the algorithm. Some of the criteria may be provided by modules 332, 336, and 338, all of which now discussed.

Quality of service module 332 may operate to ensure that a minimum level of performance is provided for a particular application or service regardless of other system demands and limitations. For example, a first service may require a minimum fixed downstream bandwidth in order to provide the desired performance. Module 332 may provide this downstream bandwidth criterion to module 334 so that module 334 can control lane usage as appropriate to ensure that the minimum downstream bandwidth is maintained. Thus, even if other services need access to downstream bandwidth, module 334 may schedule bandwidth usage for the other services as appropriate while maintaining the minimum downstream bandwidth for the first service.

Bandwidth allocation module 338 may be aware of system demands for downstream and upstream bandwidth usage, and may also be aware of the total available bandwidth of the system. The total available system bandwidth may depend on the number of lanes that exists between system 310 and system 390. For example, if each lane can carry 6 Gb/s, and there are four lanes, then the total system bandwidth is 24 Gb/s. The downstream and upstream bandwidth requirements define how much data needs to be transmitted downstream and received upstream at any given time. For example, in one instance of time, the downstream bandwidth requirement may be 8 Gb/s and the upstream bandwidth requirement may be 6 Gb/s. These requirements can be provided to module 334 so that it can control which lanes are used to accommodate the requirements. Assuming that the system has four lanes each capable of carrying 6 Gb/s, module 334 may decide to use two lanes for downstream traffic, and one lane for upstream traffic. Alternatively, module 334 may decide to only use two lanes and alternate transmission direction of one or both lanes to accommodate both streams' requirements.

Lane status module 336 may monitor the current status of lanes 328 and provide that status information to lane usage module 334. For example, module 336 may monitor which lanes are active, how much data is being transferred across those lanes, and in which direction. In effect, module 336 may provide relatively real-time information on the current status of lanes 370.

Figure 4:
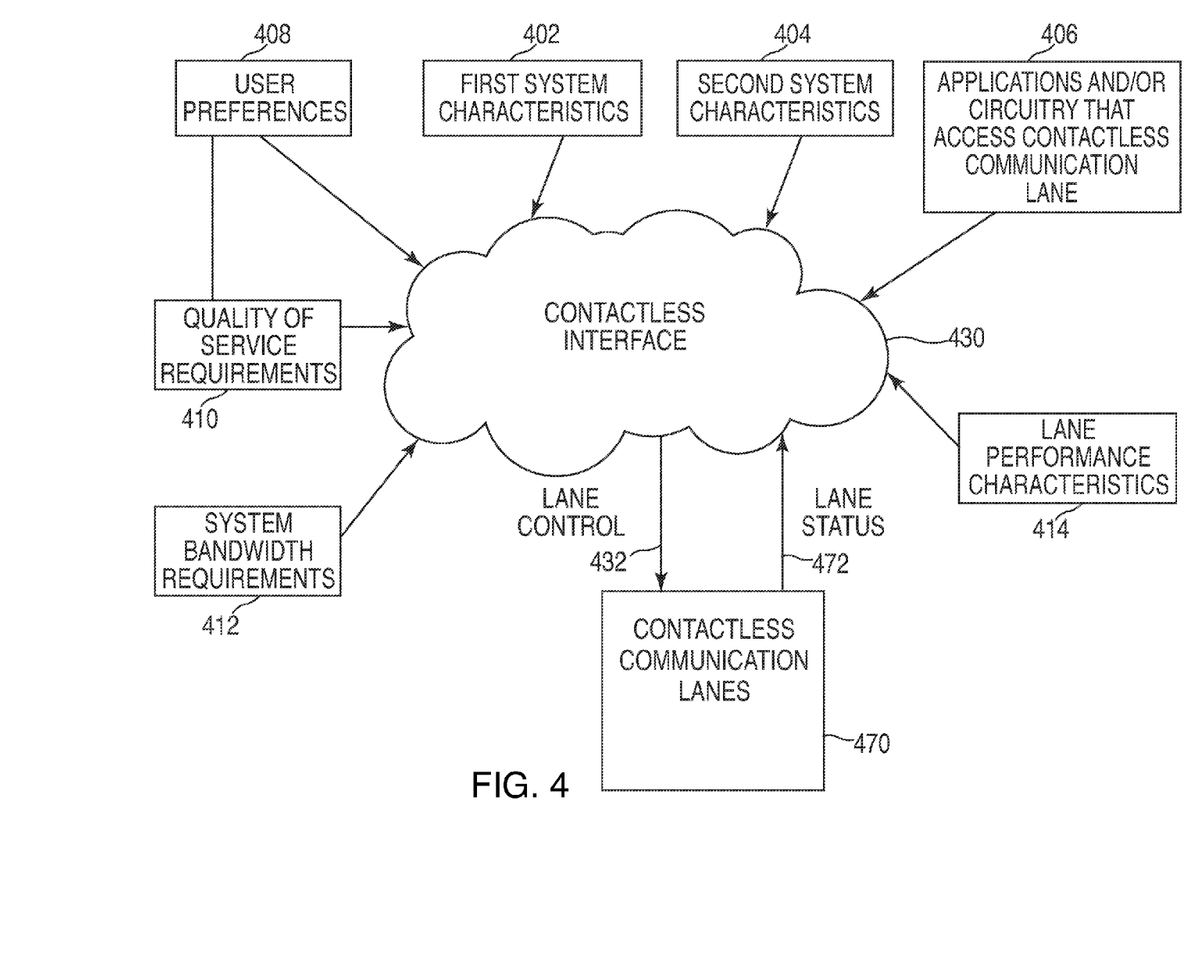
FIG. 4 shows an illustrative diagram showing various criteria that may be used by a contactless communications interface to control usage of contactless lanes, according to an embodiment.

FIG. 4 shows an illustrative diagram showing various criteria that may be used by a contactless communications interface to control usage of contactless communication lanes according to an embodiment. As shown, contactless interface 430 may receive inputs in the form of first system characteristics 402, second system characteristics 404, applications and/or circuitry that access contactless communication lanes 406, user preferences 408, quality of service requirements 410, system bandwidth requirements 412, lane performance characteristics 414, and lane status 472, and may provide an output in the form of lane control 432. First system characteristics 402 include a variety of criteria germane to a first system (e.g., system 300) that communicates with a second system (e.g., system 390). The criteria includes, but is not limited to, the number of EHF XCVR units and their capabilities and configurations, interface requirements, and power availability. Second system characteristics 404 can include similar criteria as the first system characteristics 402. Based on characteristics 402 and 404, contactless interface 430 can determine how many lanes are available for use and the total available bandwidth. Applications and/or circuitry that access contactless communication lanes 406 may refer to one or more applications or circuitry that use the communication lanes. For example, a data transfer application may require access to the communications lanes to transfer data from one system to another. As another example, a graphics processor may require access to the communications lanes to transmit display data from one system to another. In some embodiments, an application may cause circuitry to access the communications lanes. User preferences 408 may define how a user wishes to utilize the communication lanes. For example, assume that a particular user wishes to enjoy an extremely high quality sound experience when watching movies. Based on this preference, contactless interface 430 may allocate an additional communication lane to carry additional audio data to satisfy the user's preference. In some embodiments, the user preferences may be embodied in applications that access the communication lanes criteria 406.

Quality of service requirements 410 may define minimum performance metrics for particular services. In some embodiments, quality of service requirements 410 may be based on user preferences 408 (as indicated by the line connecting the two). In other embodiments, quality of service requirements 410 may be defined by an operating system or applications operating on a device. In yet other embodiments, requirements 410 may be defined by hardware requirements.

System bandwidth requirements 412 may specify the system's present upstream and downstream bandwidth needs. For example, the OS or other data handler may be aware of how much data needs to be transmitted downstream and upstream at any given time.

Lane performance characteristics 412 may specify various characteristics of the lanes. For example, characteristics 412 may specify how long it takes for a lane to change directions. That is, how long it takes for a lane to switch from being a downstream lane to an upstream lane and vice versa.

Lane status 472 may specify the usage of the communication lanes. For example, lane status 472 may specify which lanes are designated for use according to the one or more interfaces resolved between the two systems, and which lanes are actively transmitting data. It can also specify which direction data is flowing. Lane status 472 can also specify when an EHF XCVR has finished switching between transmitter and receiver modes.

Lane control 432 may specify how one or more lanes are utilized based on the received criteria inputs. For example, lane control 432 may specify which lanes are used to transmit data and which lanes are used to receive data. As another example, if contactless interface 430 determines that one or more lanes should change direction in data flow, it can send a command via lane control 432 to instruct those one or more lanes to change direction.

Figure 5:
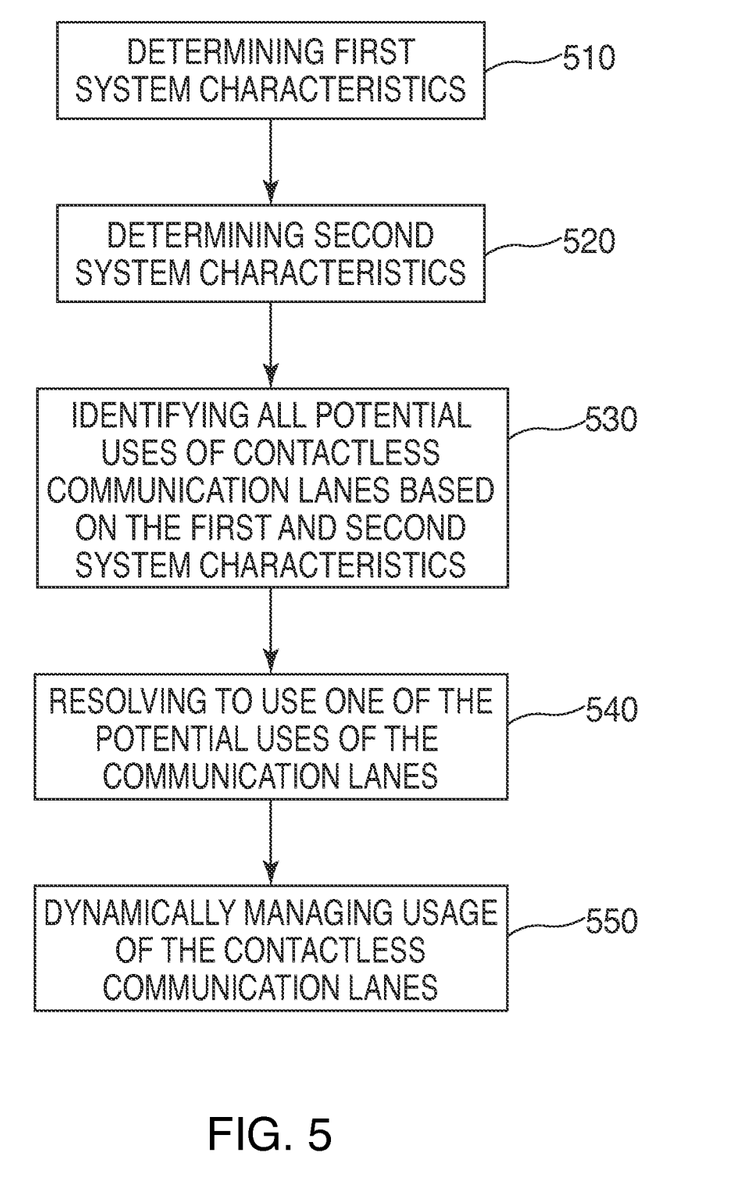
FIG. 5 shows an illustrative flowchart of steps that may be performed to manage usage of contactless communication lanes, according to an embodiment.

FIG. 5 shows an illustrative flowchart of steps that may be performed to manage usage of contactless communication lanes according to an embodiment. FIG. 5 may be described in conjunction with FIG. 6, which shows first system 600 that can be partnered up with one any of second systems 610, 620, and 630. As such, the discussion may make joint references to both FIGS. In FIG. 6, system 600 can include an OS, a contactless interface, and one or more EHF XCVRs. System 610 may include a processor and one or more EHF XCVRs and is operative to operate only according to a first interface. System 620 may include a processor and one or more EHF XCVRs and is operative to operate only according to a second interface. System 630 may include a processor, a dynamic interface selector, and one or more EHF XCVRs. System 630 may operate according to any of interfaces 1-N, and can dynamically change from one interface to another using, for example, the dynamic interface selector.

Figure 6:
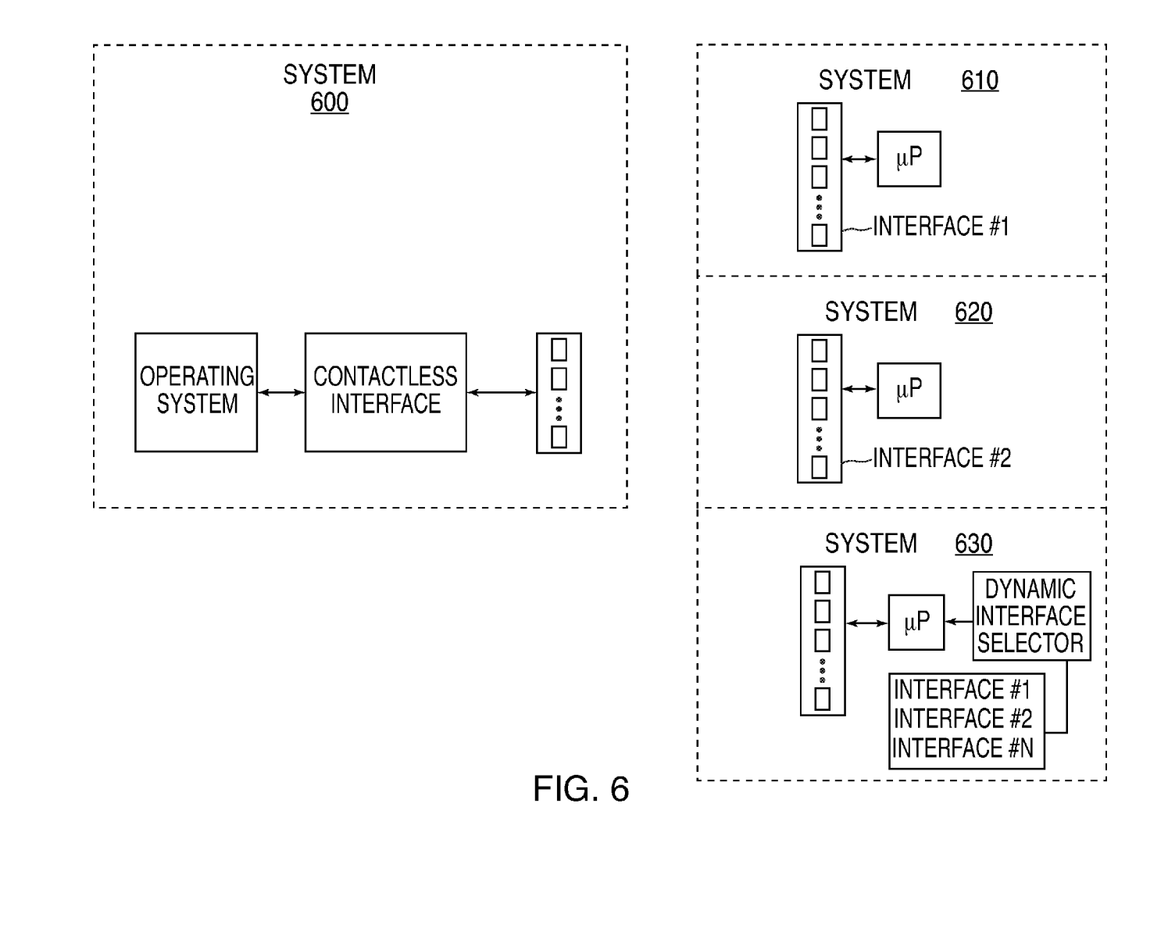
FIG. 6 shows a first system that can be partnered up with one any of several second systems, according to an embodiment.

Beginning with step 510, first system characteristics may be determined. For example, characteristics defining the operational capacity of first system 600 may be ascertained.

These characteristics may include the criteria defined above such as power, interface capabilities, and the number of EHF XCVRs and their respective capabilities. As a specific example, the first system characteristics may indicate that system 600 is capable of simultaneously supporting twelve contactless communications lanes and any available interface.

At step 520, second system characteristics may be determined. These characteristics may include the criteria defined above such as power, interface capabilities, and the number of EHF XCVRs and their respective capabilities. For example, second system 610 may have four EHF XCVRs and communicates according the first interface. System 620 may have six EHF XCVRs and communicates according to the second interface. System 630 may include ten EHF XCVRs and communicates according to any one of a number of interfaces. The second system may provide its system characteristics to the first system during part of a contactless link setup process.

At step 530, all potential uses of the contactless communication lanes existing between the first and second systems can be identified based on the first and second system characteristics. At step 540, one or both systems may resolve to use one of the identified potential uses of the communication lanes. For example, because second system 610 is limited to operating only according to the first interface, first system 610 may resolve to use of the contactless communication lanes according to the first interface. As another example, because second system 630 is capable of dynamically operating according to a number of different interfaces, first system 610 may acknowledge that multiple lane usage paradigms are available but may resolve to use the lanes according to the interface currently selected by the second system.

At step 550, usage of the contactless communication lanes may be dynamically managed. In one approach, the lanes may be repurposed to accommodate a different interface. For example, assume that second system 630 was originally operating according to a first interface, but then decides to begin operating according to a second interface. In response to the decision to operate according to the second interface, the communications lanes may be repurposed to accommodate the second interface. The repurposing may involve changing the data flow direction of one of more of the lanes, activating one or more additional lanes, shutting down one or more lanes, and the like.

In another approach, the use of the lanes may be managed based on a lane control algorithm that takes different criteria into account when deciding to dynamically manage the lanes. For example, the lane control algorithm may take user preferences, quality of service requirements, system bandwidth requirements, application requirements, land characteristic requirements, total available bandwidth, lane status, and other criteria into account when managing use of the lanes.

Figure 7A:
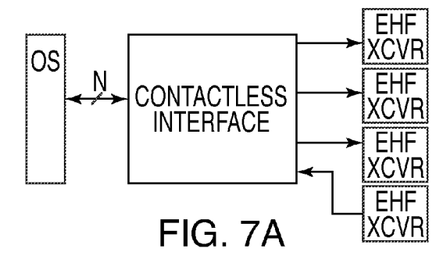
FIGS. 7A-7E shows illustrations of dynamic lane management, according to various embodiments.
Figure 7B:
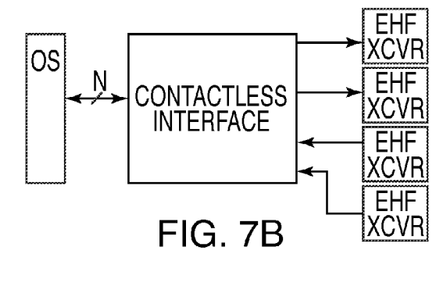
Figure 7C:
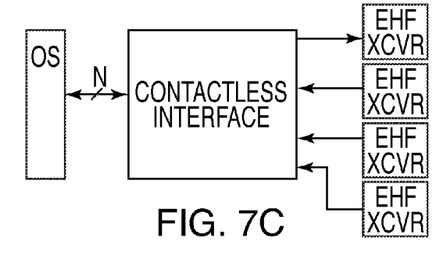
Figure 7D:
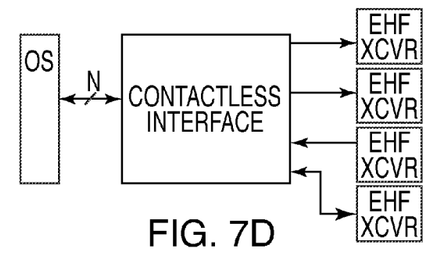
Figure 7E:
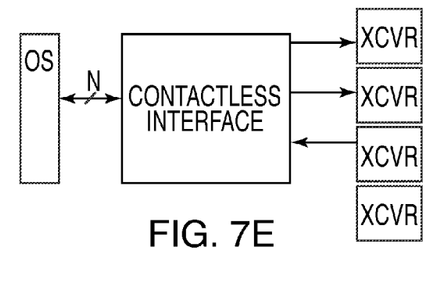

An illustration of dynamic lane management is shown in FIGS. 7A-7E, each of which may represent different snapshots in time during which a lane control algorithm manages use of four different lanes, according to various embodiments. In FIG. 7A, the lane control algorithm may designate three of the four lanes as outbound lanes and one of the lanes as an inbound lane. In FIG. 7B, the lane control algorithm designates two lanes as outbound lanes and two lanes as inbound lanes. The lane change may be the result, for example, of changes in system bandwidth demands. FIG. 7C shows yet another dynamic change of the lanes, where only one lane is outbound and the remaining three lanes are inbound. FIG. 7D shows an example where the lane control algorithm has assigned two lanes as dedicated downstream lanes and another as a dedicated upstream lane. The fourth lane is being used as a bi-directional lane that switches between upstream and downstream modes depending on bandwidth needs of the system. FIG. 7E shows an example where the lane control algorithm has shut down one of the four lanes and assigned two lanes as dedicated downstream lanes and one lane as a dedicated upstream lane. If desired, any one of the three active lanes may be used as a bi-directional lane.

It is understood that the steps shown in FIG. 5 are merely illustrative and that existing steps may be modified or omitted, additional steps may be added, and the order of certain steps may be altered.

Figure 8:
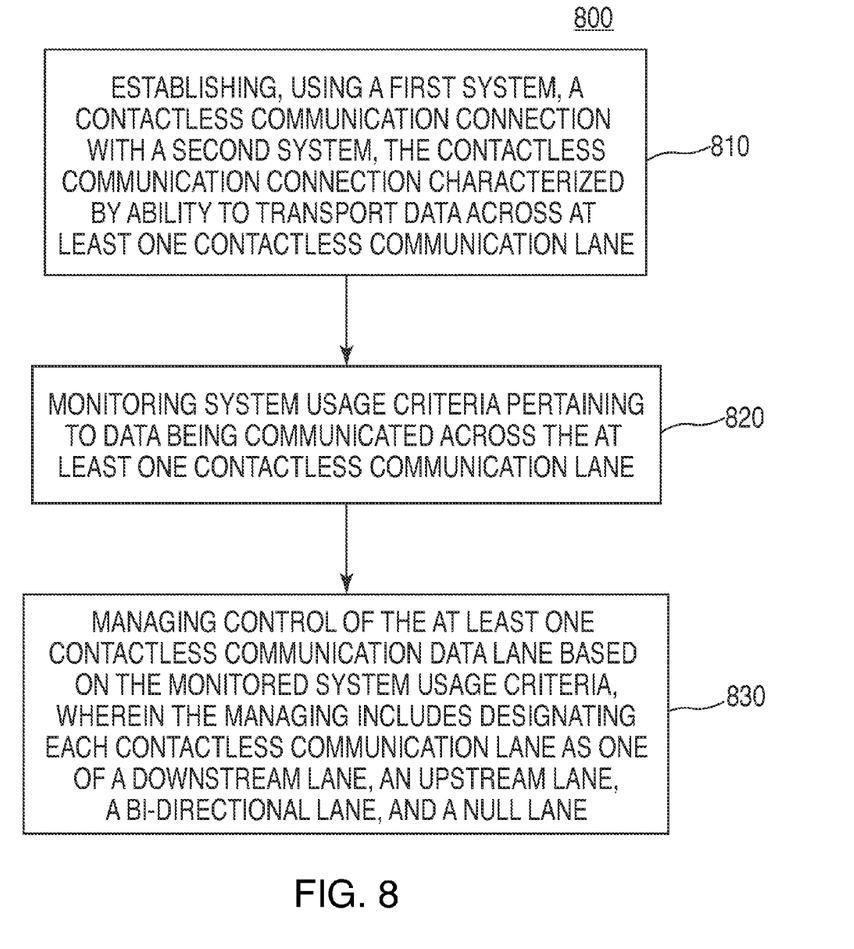
FIG. 8 shows an illustrative flowchart according to an embodiment.

FIG. 8 shows an illustrative lane control process 800 according to an embodiment. Process 800 may be implemented in a first system. Starting at step 810, a contactless communication connection with a second system can be established. The contactless communication connection can be characterized by an ability to transport data across at least one contactless communication lane. Each contactless communication lane may be formed between an EHF XCVR in the first system and a counterpart EHF XCVR in the second system. For example, in one embodiment, only one contactless communications lane may exist between the two systems. In other embodiments, two or more lanes may exist. In yet other embodiments, multiple lanes may exist but fewer than all lanes may be used at any given time.

At step 820, system usage criteria pertaining to data being communicated across the at least one contactless communication lane may be monitored. System usage criteria can include, for example, current bandwidth usage requirements, quality of service requirements, user preferences, power, and the like. At step 830, control of the at least one contactless communication data lane can be managed based, at least in part, on the monitored system usage criteria. As part of the managing, each contactless communication lane can be designated as one of a downstream lane, an upstream lane, a bi-directional lane, and a null lane. The null lane is an inactive lane that exists as part of the contactless communication connection, but is not currently being used to transport data. The bi-directional lane is a lane that selectively transports data downstream and upstream. The timing parameters for determining when it transports in the downstream or upstream direction may be controlled by the contactless interface, and it may take into account factors such as lane priority, lane performance characteristics (e.g., turn-around time), and system demands when scheduling lane usage.

It is understood that the steps shown in FIG. 8 are merely illustrative and that existing steps may be modified or omitted, additional steps may be added, and the order of certain steps may be altered. For example, the managing can be based, for example, on monitored status of the at least one contactless communications lane. For example, the contactless interface may monitor that an upstream lane is idle, but that all downstream lanes are active. The contactless interface may switch the upstream lane to a downstream lane so that downstream throughput can be increased. As such, the at least one contactless communication lane can be re-designated according to a different one of the downstream lane, the upstream lane, the bi-directional lane, and the null lane.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 2-8, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A system comprising:
a first set of contactless communication transceiver units (CCTUs) configured to contactlessly communicate data with a second set of CCTUs associated with a second system, wherein a data lane is formed for each coupled pair of CCTUs established between the first and second sets;
an operating system configured to communicate with the second system using at least one non-contactless interface protocol, wherein each of the at least one non-contactless interface protocol is characterized by a transport layer, a link layer, and a physical layer; and
a contactless communications interface (CCI) coupled to the first set of CCTUs and the operating system, the CCI enables the operating system to use any one of a plurality of non-contactless interface protocols to communicate with the second system via the first set of CCTUs by translating any one of the plurality of non-contactless interface protocols being used by the operating system to a contactless protocol.

2. The system of claim 1, wherein the CCI eliminates a need for the link and physical layers to exist within the system for each non-contactless interface protocol.

3. The system of claim 1, wherein the CCI comprises at least one contactless link layer and at least one contactless physical layer, wherein the contactless link and physical layers are interface protocol agnostic and are used in lieu of the link and physical layers of any non-contactless interface protocol.

4. The system of claim 1, wherein use of the contactless protocol eliminates a need to coordinate electrical requirements between the first and second CCTUs.

5. The system of claim 1 wherein the CCI comprises:
a translation layer module configured to function as a translation layer that enables the operating system to use any non-contactless interface protocol when communicating with the second system, the translation layer module comprising:
a mapping layer for each non-contactless interface protocol that can be accessed by the operating system, each mapping layer configured to map the transport layer of a particular non-contactless interface protocol to a contactless transport layer.

6. The system of claim 5, further comprising:
a contactless interface lane (CIL) that interfaces with the mapping layer and the first set of CCTUs.

7. The system of claim 6, wherein each of the CILs comprises a contactless link layer and a contactless physical layer.

8. The system of claim 6, wherein each CCTU of the first set is associated with a respective one of the CILs.

9. The system of claim 6, wherein the CCI comprises a quality of service module coupled to the translation layer module and operating system, the quality of service module is configured to manage use of the CILs based on criteria.

10. The system of claim 9, wherein the criteria comprises user preferences.

11. The system of claim 9, wherein the criteria comprises demand by at least one of applications and circuitry that requires access to the CILs.

12. A system comprising:
a first set of contactless communication transceiver units (CCTUs) configured to contactlessly communicate data with a second set of CCTUs associated with a second system, wherein a contactless communication data lane is formed for each coupled pair of CCTUs established between the first and second sets; and a contactless communications interface (CCI) coupled to the first set of CCTUs, the CCI enables software defined connectivity that manages use of the contactless communication data lanes to enable data communications according to a selected one of a contactless protocol and a plurality of non-contactless interface protocols.

13. The system of claim 12, wherein the plurality of non-contactless interface protocols comprises Standards protocols selected from the group consisting of USB, DisplayPort, Thunderbolt, HDMI, SATA/SAS, PCIe, Ethernet SGMII, Hypertransport, Quickpath, I2S, GPIO, and I2C.

14. The system of claim 12, wherein the software defined connectivity is provided by translating transport layers associated with any of the plurality of interface protocols to a contactless layer.

15. The system of claim 14, wherein the contactless layers provide universal access to the first set of CCTUs regardless of the interface protocol selected for governing data communications between devices.

16. A contactless communications interface (CCI) for use in a system comprising at least one contactless EHF transceiver, the CCI comprising:

a translation layer module coupled to receive data associated with at least one non-contactless transport layer, the translation layer module translates the at least one non-contactless interface transport layer to a contactless layer; and at least one communications interface lane (CIL) coupled to receive data associated with the contactless layer from the translation layer module, wherein each CIL is coupled to one of the at least one contactless EHF transceiver, wherein the at least one CIL is coupled to directly receive data associated with the contactless layer from a source external to the CCI and which does not require translation by the translation layer module.

17. The CCI of claim 16, wherein the translation layer module comprises a mapping layer for each non-contactless transport layer that requires translation to the contactless layer.

18. The CCI of claim 16, wherein each CIL comprises:
a contactless LINK layer; and
a contactless PHY layer.

19. The CCI of claim 16, further comprising:
a lane usage module that controls the directional flow of data through the at least one CIL; and
a quality of service module that manages the flow of data to and from the at least one EHF transceiver by controlling the lane usage module.

20. The CCI of claim 19, wherein the quality of service module manages the flow of data based on a plurality of different criteria.

* * * * *

UNITED STATES PATENT AND TRADEMARK OFFICE
CERTIFICATE OF CORRECTION

PATENT NO. : 9,998,567 B2
APPLICATION NO. : 14/841386
DATED : June 12, 2018
INVENTOR(S) : Isaac et al.

Page 1 of 1

It is certified that error appears in the above-identified patent and that said Letters Patent is hereby corrected as shown below:

In the Specification

In Column 3, Line 55, delete "embodiment." and insert -- embodiment; --, therefor.

In Column 6, Line 28, delete "(CIL)" and insert -- (CILs) --, therefor.

In Column 6, Line 54, delete ""$Cp_{PHY}$ layer")" and insert -- ("$C_{PHY}$ layer") --, therefor.

In the Claims

In Column 14, Claim 5, Line 37, delete "claim 1" and insert -- claim 1, --, therefor.

In Column 14, Claim 6, Line 49, delete "a contactless interface lane (CIL)" and insert -- a plurality of contactless interface lanes (CILs) --, therefor.

In Column 16, Claim 19, Line 21, delete "controls the directional" and insert -- controls directional --, therefor.

Signed and Sealed this
Fifth Day of May, 2020

Andrei Iancu
*Director of the United States Patent and Trademark Office*